US012345218B2

(12) United States Patent
Robertson et al.

(10) Patent No.: US 12,345,218 B2
(45) Date of Patent: Jul. 1, 2025

(54) PUMPING APPARATUS

(71) Applicant: Thistle Rocketry Ltd, Galashiels (GB)

(72) Inventors: David Robertson, Galashiels (GB); Ian Hanley, Galashiels (GB)

(73) Assignee: Thistle Rocketry Ltd, Galashiels (GB)

( * ) Notice: Subject to any disclaimer, the term of this patent is extended or adjusted under 35 U.S.C. 154(b) by 0 days.

(21) Appl. No.: 18/284,639

(22) PCT Filed: Mar. 18, 2022

(86) PCT No.: PCT/GB2022/050687
§ 371 (c)(1),
(2) Date: Sep. 28, 2023

(87) PCT Pub. No.: WO2022/208048
PCT Pub. Date: Oct. 6, 2022

(65) Prior Publication Data
US 2024/0426261 A1    Dec. 26, 2024

(30) Foreign Application Priority Data

Apr. 1, 2021    (GB) .................................... 2104755

(51) Int. Cl.
*F02K 9/46*    (2006.01)
*F02K 9/50*    (2006.01)
*F02K 9/58*    (2006.01)

(52) U.S. Cl.
CPC .............. *F02K 9/46* (2013.01); *F02K 9/50* (2013.01); *F02K 9/58* (2013.01)

(58) Field of Classification Search
CPC .............. F02K 9/46; F02K 9/50; F02K 9/58
See application file for complete search history.

(56) References Cited

U.S. PATENT DOCUMENTS

| | | | |
|---|---|---|---|
| 6,314,978 B1 | 11/2001 | Lanning et al. | |
| 6,499,288 B1 | 12/2002 | Knight | |
| 7,007,456 B2 | 3/2006 | Harrington | |
| 7,082,750 B2 | 8/2006 | Knight | |
| 7,257,940 B1 * | 8/2007 | Knight ...................... | F04F 1/10 60/257 |
| 7,611,333 B1 | 11/2009 | Harrington | |
| 7,784,268 B1 | 8/2010 | Greason et al. | |
| 8,950,195 B2 * | 2/2015 | Watts ..................... | B64D 37/02 62/48.2 |

(Continued)

FOREIGN PATENT DOCUMENTS

CN    111963340 A    11/2020

OTHER PUBLICATIONS

Harrington, Steve Ph.D., "High Performance Lox Hydrogen Upper Stage with Pistonless Pump," AIAA Space 2010 Conference & Exposition, American Institute of Aeronautics and Astronautics, Inc., Aug. 30-Sep. 2, 2010, Anaheim, California, 10 pages.

(Continued)

*Primary Examiner* — Kyle Robert Thomas
(74) *Attorney, Agent, or Firm* — Bradley Arant Boult Cummings LLP

(57) ABSTRACT

A pumping apparatus comprising: a pump having a plurality of chambers for sequentially supplying fuel to a combustion chamber; wherein each chamber is fluidly connected to another chamber such that venting of the chamber at least partially pressurises the other chamber.

21 Claims, 5 Drawing Sheets

(56) References Cited

U.S. PATENT DOCUMENTS

| | | | |
|---|---|---|---|
| 10,753,346 B1* | 8/2020 | Sherman | H05H 1/54 |
| 2015/0128597 A1* | 5/2015 | Schlak | B64D 31/00 |
| | | | 60/719 |
| 2015/0251766 A1* | 9/2015 | Atkey | B64D 13/08 |
| | | | 60/785 |
| 2015/0330869 A1* | 11/2015 | Ziarno | G01M 15/14 |
| | | | 701/34.4 |
| 2016/0076461 A1* | 3/2016 | Kawai | B64D 37/30 |
| | | | 60/39.463 |

OTHER PUBLICATIONS

Harrington, Steve Ph.D., "Launch Vehicle and Spacecraft System Design Using the Pistonless Pump," Space 2004 Conference and Exhibit, American Institute of Aeronautics and Astronautics, Inc., Sep. 18-30, 2004, San Diego, California, 13 pages.

Harrington, Steve Ph.D., "Pistonless Dual Chamber Rocket Fuel Pump," 39th AIAA/ASME/SAE/ASEE Joint Propulsion Conference and Exhibit, American Institute of Aeronautics and Astronautics, Inc., Jul. 20-23, 2003, Huntsville, Alabama, 6 pages.

Harrington, Steve Ph.D., "Pistonless Pump System for Accelerated Development of a Heavy lift LOX Hydrocarbon Engine," 46th AIAA/ASME/SAE/ASEE Joint Propulsion Conference & Exhibit, American Institute of Aeronautics and Astronautics, Inc., Jul. 25-28, 2010, Nashville, Tennessee, 10 pages.

Patent Cooperation Treaty, International Application No. PCT/GB2022/050687, "International Search Report," Jul. 5, 2022, 3 pages.

United Kingdom Intellectual Property Office, UK Application No. GB2104755.0, "Patents Act 1977: Search Report under Section 17(5)," Sep. 15, 2021, 3 pages.

* cited by examiner

| Time (te) | Chamber 1 | Chamber 2 | Chamber 3 | Chamber 4 |
|---|---|---|---|---|
| 1 | Emptying | Full | Full | Full |
| 2 | Vent&Fill | Emptying | Full | Full |
| 3 | Pre-Press | Vent&Fill | Emptying | Full |
| 4 | Full | Pre-Press | Vent&Fill | Emptying |
| 5 | Emptying | Full | Pre-Press | Vent&Fill |
| 6 | Vent&Fill | Emptying | Full | Pre-Press |
| 7 | Pre-Press | Vent&Fill | Emptying | Full |
| 8 | Full | Pre-Press | Vent&Fill | Emptying |

Figure 2

PUMPING APPARATUS

The present invention relates to pumps and pumping apparatus. In particular, but not exclusively, the present invention relates to pumping apparatus for use within rockets.

BACKGROUND

A rocket requires a pump to move propellant from a storage tank to the combustion chamber. The performance of a rocket depends on the weight of the propellant tanks, the weight of the combustion chamber and the weight of the pump. Each of these components must be as light as possible for optimum performance.

Typically, there are two types of pumps that are used in rockets. The first type is the use of pressurised tanks. However, this requires heavy tanks made from high strength materials which reduce rocket performance because of their weight. The second type is the use of turbopumps. However, this type of pump is complex and expensive. Also, the propellant may be a gelled propellant. However, gelled propellants are notoriously difficult to deal with in a centrifugal pump due to their non-Newtonian nature.

There is an increased demand for small scale rocket launches, such as for launching miniature satellites or Cube-Sats.

It is an object of the disclosure to address one or more of the above-mentioned limitations.

SUMMARY

According to a first aspect of the present invention there is provided a pumping apparatus comprising: a pump having a plurality of chambers for sequentially supplying fuel to a combustion chamber; wherein each chamber is fluidly connected to another chamber such that venting of the chamber at least partially pressurises the other chamber.

Optionally, the pumping apparatus includes a pressure vessel for storing a fluid. Optionally, the fluid is stored at high pressure. Optionally, each chamber is fluidly connected to the pressure vessel. Optionally, an upper portion of each chamber is fluidly connected to the pressure vessel.

Optionally, a valve is provided at each connection between the pressure vessel and the chambers. Optionally, the valve is a proportional valve.

Optionally, the pumping apparatus includes a storage tank for storing propellant. Optionally, each chamber is fluidly connected to the storage tank. Optionally, a lower portion of each chamber is fluidly connected to the storage tank.

Optionally, a valve is provided at each connection between the storage tank and the chambers.

Optionally, each chamber is fluidly connected to the combustion chamber.

Optionally, a valve is provided at each connection between the combustion chamber and the chambers.

Optionally, each chamber is fluidly connected to another chamber by a venting conduit.

Optionally, a valve is provided at each connection between the chambers.

Optionally, the pumping apparatus includes a controller for controlling the sequential opening and closing of one or more of the valves.

Optionally, the controller is configured to open the valve at the conduit connecting the pressure vessel and a first chamber to pressurise the first chamber.

Optionally, the controller is configured to open the valve at the conduit connecting the combustion chamber and the first chamber such that propellant flows to the combustion chamber.

Optionally, the controller is configured to maintain the valve at the conduit connecting the pressure vessel and a first chamber at an at least partially open position to maintain a substantially constant pressure within the first chamber as the first chamber is emptied of propellant.

Optionally, the controller is configured to close the valve at the conduit connecting the combustion chamber and the first chamber when the first chamber is empty of propellant.

Optionally, the controller is configured to open the valve at the venting conduit such that the first chamber vents to and at least partially pressurises another chamber.

Optionally, the controller is configured to open the valve at the connection between the storage tank and the first chamber such that the first chamber is refilled.

Optionally, the controller is configured to carry out the same sequence as for the first chamber with another chamber.

Optionally, the pump has four chambers for sequentially supplying fuel to a combustion chamber.

Optionally, the controller is configured to switch to an alternate sequence in the event of failure of one of the chambers or its associated components, the alternate sequence also including venting of a chamber to at least partially pressurise another chamber.

Optionally, the pumping apparatus is used to pump propellant within a rocket.

Optionally, the pumping apparatus includes one or more sensors for sensing one or both of the pressure and flow rate of the propellant.

Optionally, the pumping apparatus includes feedback control and the one or more sensors are connected to the feedback control.

Optionally, the feedback control comprises a proportional-integral-derivative controller (PID controller) or a proportional-integral-velocity controller (PIV controller).

According to a second aspect of the present invention there is provided a method of supplying fuel to a combustion chamber, the method comprising:
  providing a pump having a plurality of chambers for sequentially supplying fuel to a combustion chamber;
  fluidly connected each chamber to another chamber such that venting of the chamber at least partially pressurises the other chamber.

BRIEF DESCRIPTION OF THE DRAWINGS

The disclosure is described in further detail below by way of example and with reference to the accompanying drawings, in which:

FIG. 2 is a table illustrating a state of the pumping apparatus of FIG. 1 when in operation;

DETAILED DESCRIPTION

Figure 1:
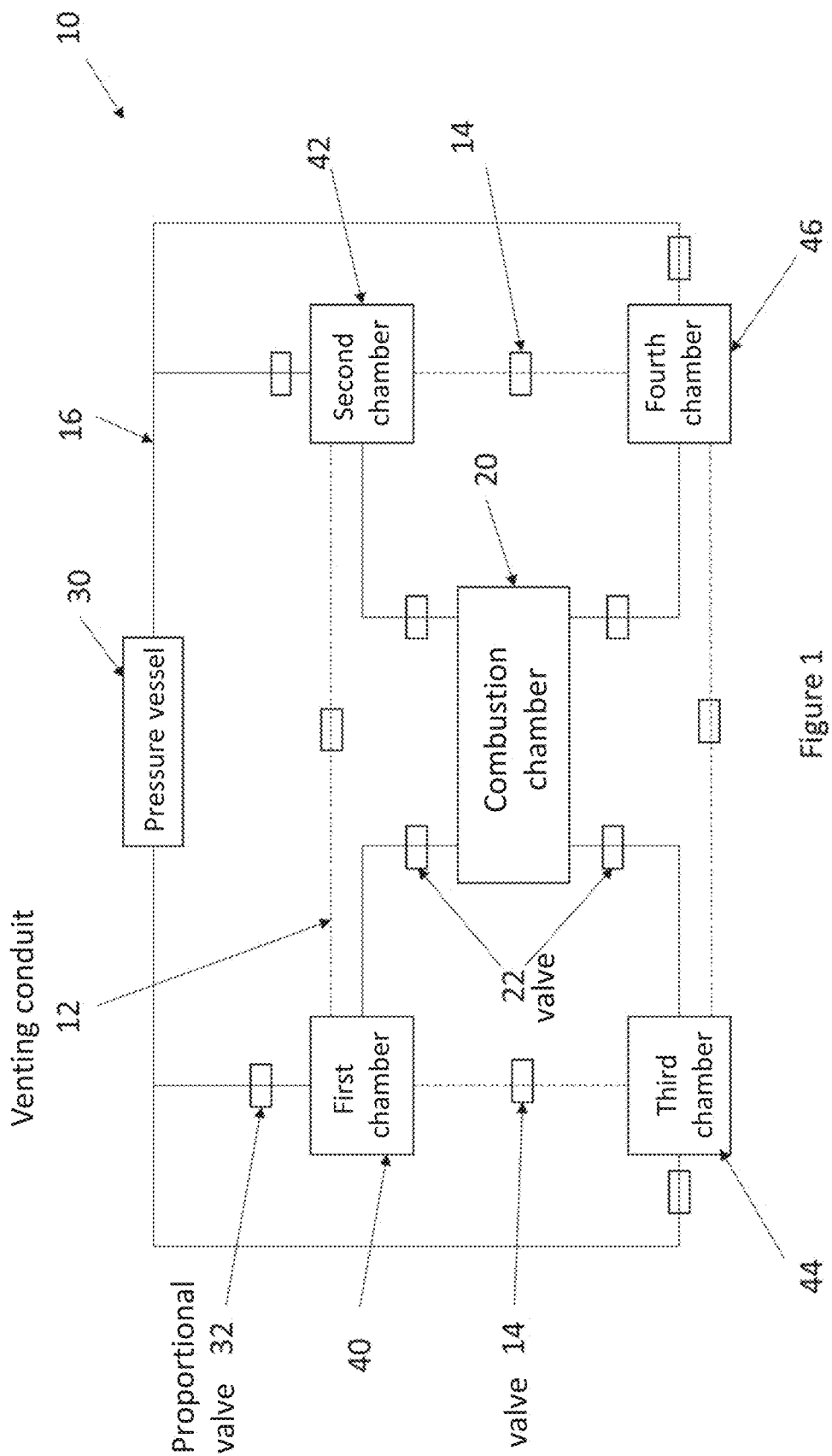
FIG. 1 is a diagrammatic view of a pumping apparatus according to the present invention.

FIG. 1 shows a pumping apparatus which comprises a pump 10 having a plurality of chambers 40, 42, 44, 46 for sequentially supplying fuel to a combustion chamber 20. As shown by the dashed lines in FIG. 1, each chamber is fluidly connected to other chambers by venting conduits 12 so that venting of one chamber at least partially pressurises another chamber. For clarity, each chamber in FIG. 1 is connected by venting conduits 12 to two other chambers. However, different arrangements are possible. For example, it is most advantageous that each chamber be connected to all other chambers. This is shown in FIGS. 4 to 7 and described below. A valve 14 is provided at each connection between the chambers.

The pumping apparatus includes a pressure vessel 30 for storing a high-pressure fluid, such as air or another gas. Each chamber is fluidly connected to an upper portion of the pressure vessel 30. A valve 32 is provided at each connection between the pressure vessel 30 and the chambers. The valve 32 is a proportional valve so that the flow rate of the fluid entering each chamber can be controlled.

The pumping apparatus also includes a storage tank for storing propellant. For clarity, this is not shown in FIG. 1. Each chamber is fluidly connected to a lower portion of the storage tank. A valve (not shown) is provided at each connection between the storage tank and the chambers.

Each chamber is also fluidly connected to the combustion chamber 20. A valve 22 is provided at each connection between the combustion chamber and the chambers.

The pumping apparatus includes a controller (not shown) for controlling the sequential opening and closing of the valves.

In operation, in the initial stage, all four chambers are filled with propellant. Propellant is fed into the chambers from a low-pressure propellant tank, typically at around 300 kPa. Compared to conventional pumping apparatus that use pressurised tanks, this is a relatively low pressure which allows a lighter storage tank for the propellant.

To begin combustion, the controller is configured to fully open the valve 32 at the conduit connecting the pressure vessel 30 and a first chamber 40 to pressurise the first chamber. When the appropriate pressure is reached, the controller then opens the valve 22 at the conduit connecting the first chamber 40 to the combustion chamber 20. This causes the propellant in the first chamber 40 to be expelled downstream to the combustion chamber 20. A flow meter is also provided at the conduit to measure the flow rate of the propellant.

As propellant is expelled from the first chamber 40, the pressure in the first chamber 40 would decrease. However, the controller is configured to maintain the proportional valve 32 at a partially open position to maintain a substantially constant pressure within the first chamber 40.

When the first chamber 40 is at 10% capacity of propellant, the controller opens the valve at the conduit between the pressure vessel 30 and a second chamber 42 and the second chamber 42 is pressurised. The first and second chambers share supply of propellant until the first chamber 40 is exhausted. The controller then closes the valve at the conduit connecting the combustion chamber 20 and the first chamber 40.

In alternative embodiments, many of the valves, such as the valve at the conduits connecting the combustion chamber 20 and the chambers may be passive in operation. They may respond to secondary effects of upstream control. For example, the active control upstream changes pressure differentials through the system, to which the passive check valves may respond. Therefore, in such embodiments, the controller is not required to open or close these valves.

At this stage, the first chamber 40 is empty of propellant but fully pressurised. Therefore, it is not possible to refill the first chamber 40 from the low-pressure storage tank. In conventional pumping apparatus, the first chamber 40 would then be vented to atmosphere. This is wasteful in energy and requires a higher capacity (and heavier) pressure vessel 30 to repressurise each chamber once it has discharged its propellant and been refilled.

The present invention overcomes this disadvantage. Rather than venting the first chamber 40, the controller is configured to open the valve 14 at the venting conduit such that the first chamber vents to and at least partially pressurises another chamber, such as a third chamber 44. When the first chamber 40 is at atmospheric pressure, it can be refilled with propellant.

The above sequence is repeated for the other chambers. When the second chamber 42 is at 10% capacity of propellant, the controller opens the valve at the conduit between the pressure vessel 30 and the third chamber 44. However, the third chamber 42 has already been at least pre-pressurised by the venting of the first chamber 40. Therefore, little or no supply of fluid from the pressure vessel 30 is required.

When the second chamber 42 is empty of propellant but fully pressurised, the controller opens the valve 14 at the venting conduit such that the second chamber 42 vents to and at least partially pressurises a fourth chamber 46. When the second chamber 42 is at atmospheric pressure, it can be refilled with propellant.

In a similar manner, when the third chamber 44 is empty but fully pressurised, the third chamber 44 can be vented to repressurise the first chamber 40.

Then the whole sequence can be repeated one or more times for as long as required. It is estimated that the present invention can save 91% of pre-pressurisation pressurant requirements.

Figure 3:
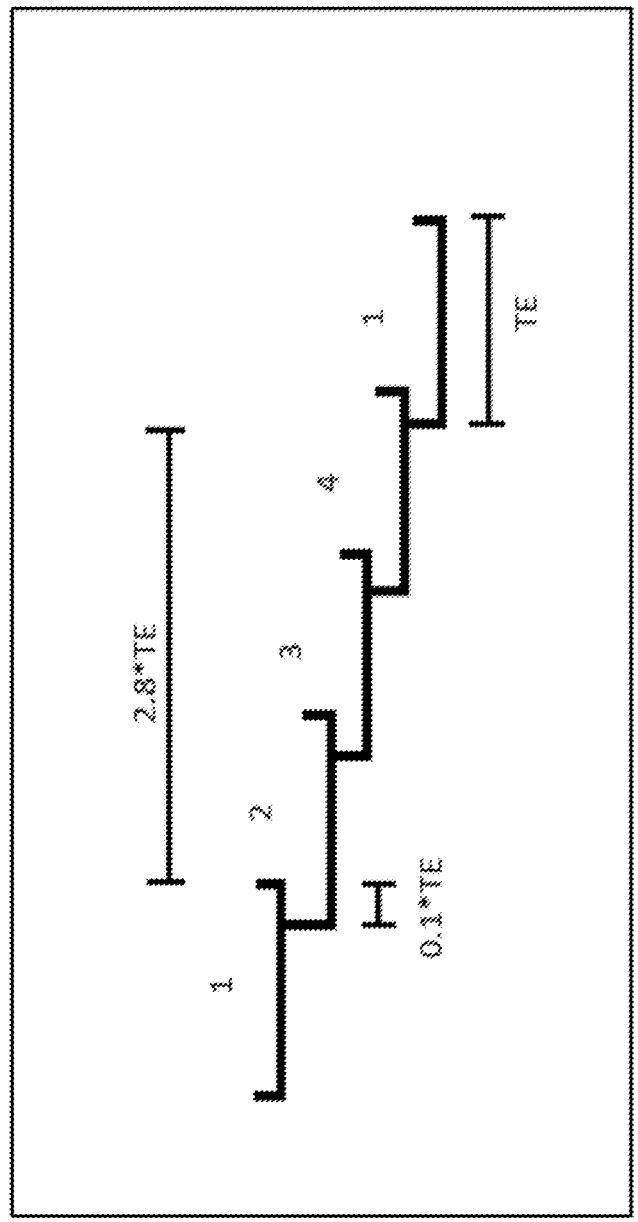
FIG. 3 is a diagrammatic representation of the workings of the pumping apparatus of FIG. 1.

FIG. 2 shows a table of the state of the chambers during two cycles of the sequence described above. This cyclical operation of the system allows a constant mass flow rate supply to the combustion chamber. FIG. 3 is a diagrammatic representation of one cycle over time. In FIGS. 2 and 3, TE denotes 'time to empty' for the chamber.

Figure 5:
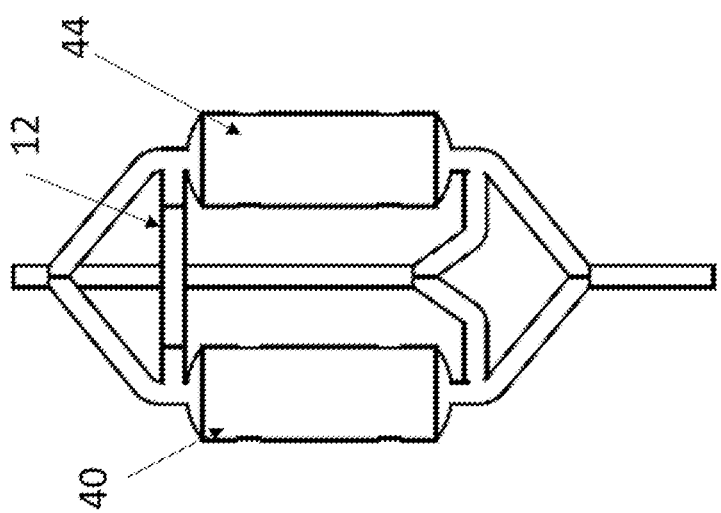
FIG. 5 is a lateral sectional view of the plurality of chambers of FIG. 4A.
Figure 4:
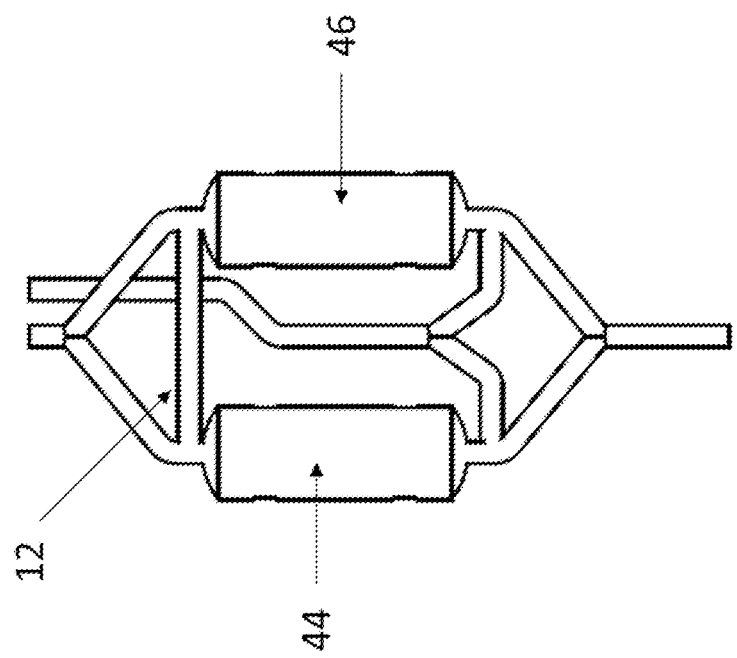
FIG. 4 is front sectional view of a plurality of chambers of a pumping apparatus according to a specific embodiment of the present invention.
Figure 7:
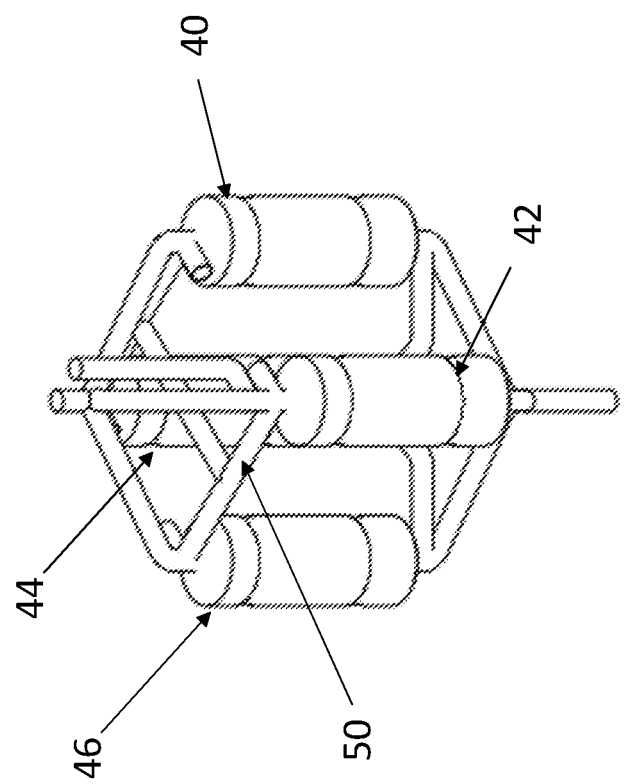
FIG. 7 is a three-dimensional view of the plurality of chambers of FIG. 4.
Figure 6:
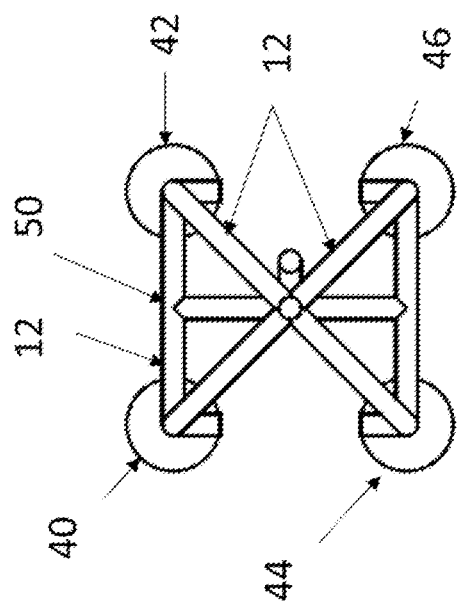
FIG. 6 is a top sectional view of the plurality of chambers of FIG. 4.

FIGS. 4 through 7 show multiple views of a plurality of chambers of a pumping apparatus according to a specific embodiment of the present invention. FIG. 4 is front sectional view, FIG. 5 is a lateral sectional view, FIG. 6 is a top sectional view and FIG. 7 is a three-dimensional view of the plurality of chambers. It will be appreciated that the component sizes shown in FIGS. 4-7 are simply exemplary and that the present disclosure is not limited to any specific component size. In FIGS. 4 to 4, all chambers are connected to each other by venting conduits 12.

At the top of each chamber there is a three-way junction. Opening the valve at the conduit connecting to the pressure vessel 30 supplies pressure to the chamber. All four chambers are connected to one another by a T shaped pressure sharing conduit 50. A valve is provided at each of the four inlets to the chambers. These valves are opened by the controller according to which of the chambers is to share with which of the others.

The controller receives feedback from the chambers and flow and pressure sensors. Feedback control can be used to provide proactive stabilisation of combustion. The feedback control can comprise a PID controller or a PIV controller.

The system is also capable of intelligent failure response. Set up with the correct control code for the pumping apparatus, fallback modes can be initiated. If there were a rupture, a valve failure, or other unforeseen issue concerning one of the chambers, the controller can switch to an alternative sequence involving the surviving chambers. When reduced to three chamber operation, the pressure recycling system can still operate.

Therefore, the present invention is highly failure tolerant. Further protection can be offered by mounting the pump inside the propellant tanks.

The present invention is also extremely simple to design and build, has no more complex parts than the valves and sensors. It is particularly advantageous for use in rocketry applications where the mass of components must be as low as possible.

Various modifications and improvements can be made to the above without departing from the scope of the invention.

The invention claimed is:

1. A pumping apparatus comprising:
   a pump having at least three chambers for sequentially supplying fuel or propellant to a combustion chamber;
   wherein each chamber is fluidly connected to another chamber among the at least three chambers, and wherein for each chamber venting of the chamber at least partially pressurises the other chamber.

2. The pumping apparatus as claimed in claim 1, including a pressure vessel for storing a fluid, and wherein each chamber is fluidly connected to the pressure vessel by a dedicated conduit.

3. The pumping apparatus as claimed in claim 2, wherein a valve is provided at each connection between the pressure vessel and the chambers.

4. The pumping apparatus as claimed in claim 3, wherein the valve provided at each connection between the pressure vessel and the chambers is a proportional valve.

5. The pumping apparatus as claimed in claim 3, wherein the pumping apparatus includes a controller for controlling the sequential opening and closing of one or more of the valves.

6. The pumping apparatus as claimed in claim 5, wherein the at least one of:
   the controller is configured to open the valve at the conduit connecting the pressure vessel and a first chamber to pressurise the first chamber; and
   the controller is configured to open the valve at a conduit connecting the combustion chamber and the first chamber such that the fuel or propellant flows to the combustion chamber.

7. The pumping apparatus as claimed in claim 5, wherein the controller is configured to close the valve at the conduit connecting the combustion chamber and the first chamber when the first chamber is empty of fuel or propellant.

8. The pumping apparatus as claimed in claim 5, wherein the controller is configured to open the valve at the venting conduit between the first chamber and another chamber among the at least three chambers, such that the first chamber vents to and at least partially pressurises the said another chamber.

9. The pumping apparatus as claimed in claim 5, wherein the at least one of:
   the controller is configured to open the valve at the connection between a storage tank and the first chamber such that the first chamber is refilled; and
   the controller is configured to carry out the same sequence as for the first chamber with another chamber.

10. The pumping apparatus as claimed in claim 5, wherein the controller is configured to carry out the same sequence as for the first chamber with another chamber.

11. The pumping apparatus as claimed in claim 5, wherein the controller is configured to switch to an alternate sequence in the event of failure of one of the chambers or its associated components, the alternate sequence also including venting of a chamber to at least partially pressurise another chamber.

12. The pumping apparatus as claimed in claim 1, including a storage tank for storing fuel or propellant, and wherein each chamber is fluidly connected to the storage tank.

13. The pumping apparatus as claimed in claim 12, wherein a valve is provided at each connection between the storage tank and the chambers.

14. The pumping apparatus as claimed in claim 1, wherein each chamber is fluidly connected to the combustion chamber.

15. The pumping apparatus as claimed in claim 14, wherein a valve is provided at each connection between the combustion chamber and the chambers.

16. The pumping apparatus as claimed in claim 1, wherein each chamber is fluidly connected to another chamber by a venting conduit in a closed loop.

17. The pumping apparatus as claimed in claim 16 wherein a valve is provided at each connection between the chambers.

18. The pumping apparatus as claimed in claim 1, wherein the pump has four chambers for sequentially supplying fuel or propellant to a combustion chamber.

19. The pumping apparatus as claimed in claim 1, wherein the pumping apparatus is used to pump fuel or propellant within a rocket.

20. A pumping apparatus comprising:
   a pump having a plurality of chambers for sequentially supplying fuel or propellant to a combustion chamber;
   wherein each chamber is fluidly connected to another chamber, such that venting of the chamber at least partially pressurises the other chamber;
   a pressure vessel for storing a fluid, and wherein each chamber is fluidly connected to the pressure vessel;
   wherein a valve is provided at each connection between the pressure vessel and the chambers;
   a controller for controlling the sequential opening and closing of one or more of the valves;
   wherein the controller is configured to maintain the valve at the conduit connecting the pressure vessel and a first chamber at an at least partially open position to maintain a substantially constant pressure within the first chamber as the first chamber is emptied of fuel or propellant.

21. A method of supplying fuel or propellant to a combustion chamber, the method comprising:
   providing a pump having at least three chambers for sequentially supplying fuel or propellant to a combustion chamber; and
   fluidly connecting each chamber to another chamber among the at least three chambers, and wherein for each chamber venting of the chamber at least partially pressurises the other chamber.

* * * * *